United States Patent
Weber et al.

(10) Patent No.: US 6,491,972 B1
(45) Date of Patent: *Dec. 10, 2002

(54) METHOD OF PROTECTING SURFACES OF GLASS SUBSTRATES

(75) Inventors: Andreas Weber, Mainz (DE); Reiner Mauch, Ingelheim (DE); Roland Buerkle, Nieder-Olm (DE); Andreas Berndt, Oldenburg (DE); Dirk Schlatterbeck, Mainz (DE); Marten Walther, Engelstadt (DE)

(73) Assignee: Schott Glas, Mainz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/504,607

(22) Filed: Feb. 15, 2000

(30) Foreign Application Priority Data

Feb. 16, 1999 (DE) .......................... 199 06 333

(51) Int. Cl.⁷ .............................. B05D 1/02; B05D 1/18; B65B 33/00
(52) U.S. Cl. ....................... 427/154; 427/421; 427/428; 427/443.2; 428/332; 428/442
(58) Field of Search ............................. 428/332, 442; 427/154, 421, 428, 443.2

(56) References Cited

U.S. PATENT DOCUMENTS 4,053,666 A 10/1977 Taylor et al. ............... 428/213
5,026,597 A * 6/1991 Franz et al. ................ 428/323
5,550,182 A 8/1996 Ely et al. .................... 524/557
6,233,972 B1 * 5/2001 Foster et al. ................ 65/60.3

FOREIGN PATENT DOCUMENTS

| BE | 714 347 | 10/1988 |
| DE | 36 15 277 A1 | 11/1986 |
| JP | 59-30735 | 2/1984 |
| JP | 10-226537 | 8/1998 |

OTHER PUBLICATIONS

Abstract From Pascal Databank, Tex J., et al, DSM Research, Polyolafins Department, Netherlands. (1997).

* cited by examiner

*Primary Examiner*—D. S. Nakarani
(74) *Attorney, Agent, or Firm*—Michael J. Striker

(57) ABSTRACT

A method of protecting a surface of a display glass or a hard disk substrate during processing arid transport includes applying at least one polyvinyl alcohol or other polymer protective layer on the surface, which is soluble in polarorganic solvents, so that the layer can be removed after processing and transport by washing in heated water or a polar organic solvent without leaving residues on the surface. The polyvinyl alcohol used to make the protective coating has an average molecular weight of ≧ about 60,000 g/mol and a hydrolysis degree of ≧95% and the at least one polyvinyl alcohol layer is dried by heating at temperatures of about 150° C. or less to form the protective coating after applying the polyvinyl alcohol layer. The other polymers are less soluble in water than polyvinyl alcohol but are easily removed with organic solvent.

12 Claims, 1 Drawing Sheet

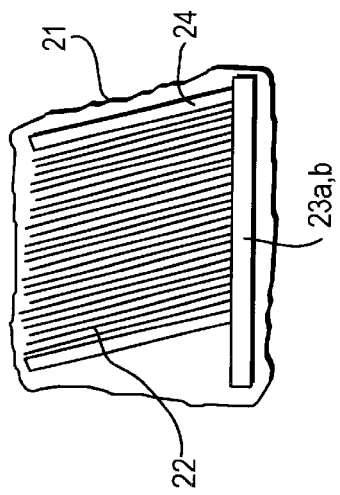
FIG. 2
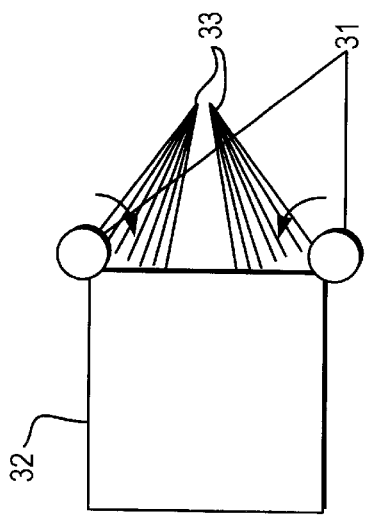
FIG. 4
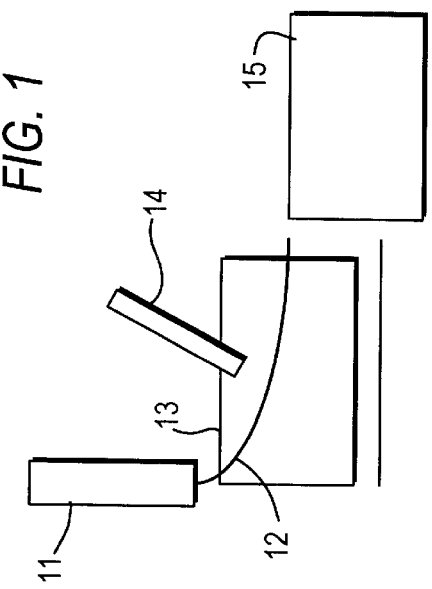
FIG. 1
FIG. 3

METHOD OF PROTECTING SURFACES OF GLASS SUBSTRATES

BACKGROUND OF THE INVENTION

The present invention relates to a method of applying an at least one-layer removable polymer coating on glass substrates, in particular display glasses or solid plate substrates, as a protective layer. The present invention also relates to a display glass,:and an electronic device, which includes the display glass. Moreover, the present invention also relates to hard disk substrates of glass or glass ceramic.

Glass substrates are substrates of conventional glass as well as substrates or glass ceramic. During the production of glass substrates, in particular for display glasses or solid plate substrate of glass or glass ceramic, there are massive yield problems, since the glass substrate due to treatment and transportation have defects in form of scratches and particles. These scratches moreover can induce glass breakage which acts destructively when occurred during a process step, since-the process must be interrupted for cleaning the machines from such chips which can cause further scratches.

During splitting and cross cutting, particles are released, and they lie on the glass surface and act as abrasive particles during the further transportation and treatment so as to lead to scratching of the surface. Also, the edge treatment which follows the separation of the substrate leads to loading of the glass surface with glass particles, which again act as abrasive bodies. Moreover, during the edge treatment for cooling and for removal of the grinding solution, a high pressure water jet is oriented to the edges.

Methods are known, in which at both sides polymer foil is laminated. Such methods have several disadvantages. The protective foil can be applied after the cutting of the glass and can therefore protect only during the transport and during the edge treatment. During the edge treatment the foil is partially lifted at the edges and under it a grinding dust is collected and the glass is damaged. Moreover, especially in thin glass, due to the required pulling force for removing the foil glass breakage again occurs in many instance.

For the lamination of the polymer protective foil, adhesives materials are required, which not always can be removed without resides. The glass surface must be polished thereafter in certain circumstances, to obtain the required quality. The post-polishing is performed mainly mechanically and removes the adhesive residuals, but on a microscopic plane does not lead to an optimal surface quality, as desired for example for display glass or optical special glass or also solid plate substrate, since by polishing minute scratches are produced. A great disadvantage is also the high refuse by glass breakage during polishing.

The German patent document DE 36 15 277 A1 discloses a method, in which the flat glass is provided with a scratch-resistant splinter protecting coating. Immediately after the manufacture, within the cooling region a synthetic plastic powder is applied, which is melted on the glass band. For increasing the mechanical stability, a base layer and a scratch-resistant cover layer are applied. The sprinter protective layer produced in this manner can not be again removed. In addition, no surface quality which is suitable for display is obtained. Utilization as a solid plate substrate is not possible due to the synthetic plastic layer.

The Japanese patent document JP-H 102 26537 discloses a method, in which a water-soluble protective film is applied, which does not affect the glass (it does not contain alkali salt) and is resistant against moisture. For the protective film, polyvinyl alcohol solutions in water are utilized, wherein the polyvinyl alcohol has an average molecular mass of at most 51,600 g/mol, preferably under 25,800 g/mol, and is partially hydrolyzed, preferably between 55% and 85%. The upper limits are based on that, with high average molecular masses as well as with hydrolysis degrees below substantially 95%, the water solubility dramatic drastically reduces. With low hydrolysis degrees, to the contrary, the water solubility increases with the hydrolysis degree. This protective film of polyvinyl alcohol with an average molecular mass of less than approximately 50,000 g/mol and a hydrolysis degree between 55% and 85% is sufficiently water soluble even below 30° C. Such a polyvinyl alcohol protective film is removed during the edge treatment in the shortest time.

The patent document BE 714347 discloses a further process on the basis of a water soluble polymer protective film. In this process a mixture of hydroxylethycellulose and dialdehyde in water or of polyvinylalcohol and dialdehyde in water is used. The dialdehyde has the action of a crosslinking agent which makes the protective film swellable and reduces the adherence of the protective film to the glass. By the admixing of a dialdehyde, the water solubility of the polymer protective layer is adjusted. There is no disclosure as to the polymerization degree of the preferable polyvinylalcohol. The hydrolysis degree must be at 85% or higher. It has been however shown that the protective films of such polymers are removed during the edge treatment.

SUMMARY OF THE INVENTION

Accordingly, it is an object of the present invention to provide a method for protection of surfaces of glass substrates, in accordance with which the surfaces of glass substrates from the production to the end stages of the treatment, in particular the wet edge treatment, and during all intermediate transports are protected from scratching and abrasive bodies, which also can be performed with a lowest possible number of process steps, with which the refuse is minimized, and which guarantees the highest possible surface quality of the end product.

It is also an object of present invention to provide a display glass which at low manufacturing cost has an excellent surface quality, or an electronic device which is provided with such a display glass.

Moreover, it is also an object of present invention to provide a hard disk substrate, which has low manufacturing costs and an excellent surface quality.

In keeping with these objects and with others which will become apparent hereinafter, one feature of present invention resides, briefly stated, in a method of applying a detachable protective coating comprising at least one layer of polyvinyl alcohol on a glass substrate, in particular a display glass or a hard disk substrate in which the applied polyvinyl alcohol has an average molecular weight $\geqq 55,000$ g/mol and a hydrolysis degree $\geqq 95\%$.

In accordance with another feature of present invention a method is provided, in accordance with which a polymer is utilized, which is soluble in polar organic solvent.

Still another feature of present invention resides in a display glass which before, during or after transport and/or complete treatment is not polished.

In accordance with a further feature of present invention a display glass is provided which has at least one removable polymer layer, and the at least one polymer layer is soluble in water at a temperature $\geqq 50°$ C., or in a polar organic solvent, or in a mixture of water and a polar organic solvent.

In accordance with still a further feature of present invention, an electronic device is proposed which has a display glass, and the display glass before, during or after the transport and/or complete treatment is not polished.

Also, a hard disk of glass or ceramic is disclosed, which before, during after transportation and/complete treatment is not polished.

In accordance with another feature of the invention, also a hard disk is disclosed, which is composed of glass or glass ceramic and has at least one releasable polymer layer, and the at least one polymer layer is soluble in water at a temperature greater than or equal to 50° C. or in a polar organic solvent or in a mixture of water and a polar organic solvent.

Finally, it is proposed to use a glass or ceramic substrate as an initial blank for a hard disk used in electronic devices.

In accordance with a further method, at least one layer of polyvinyl alcohol is applied on the glass substrate. The polyvinyl alcohol has an average molecular weight of greater than or equal to 55,000 g/mol and a hydrolysis degree greater than or equal to 95%. The thusly produced at least one polyvinyl alcohol layer is difficult to dissolve in cold water and resists the wet edge treatment. Depending on the requirements, the glass substrate is coated on both sides or only on one side.

The coating can be removed by washing with water with a temperature 50° C. and higher, in particular 60° C. and higher, preferably 70° C. and higher, and in particular preferably 80° C. and higher. The higher the water temperature, the faster can be the coating released. The pH value is Due to the at least one polyvinyl alcohol layer, the original surface quality of the glass substrate surface during the whole treatment process and a possible transportation is maintained satisfactory. The removal by washing with water of the at least one polyvinyl alcohol layer is on the one hand very safe, so that in very thin glasses very little glass breakage occurs, and, on the other hand, it is very thorough since the at least one polymer layer is completely removed.

By an additional post-polishing, the surface quality is reduced by microscopic scratches and waste due to glass breakage is increased. Post-polishing is dispensed with when the glasses are produced in accordance with the inventive method.

It has been determined in an advantageous manner that for the coating polyvinylalcohol with an average molecular weight $\geq 100,000$ g/mol, especially $\geq 150,000$ g/mol is preferable.

It also has been found advantageous to use polyvinyl alcohol with hydrolysis degree $\geq 97.5$.

The water solubility at room temperature of polyvinylalcohol with high average molecular masses and very high hydrolysis degree is however extremely poor (quasi non soluble), the water solubility at high temperatures is to the contrary very good. Therefore, these very high polymerized polyvinylalcohols are suitable for protecting the glass substrate surface during treatment step of the moist edge treatment, during which for cooling and transportation of the grinding solution in cold, for example ambient temperature, high pressure water jet is oriented to the edge.

For the process it is technically advantageous to use aqueous solutions of 1 to 30 weight %, in particular 1 to 20 weight %, in particular preferably 5 to 10 weight % for applying of the polyvinylalcohol.

In a second method, at least one layer of a polymer is applied on the glass substrate, which is soluble in a polar organic solvent. Preferable are polar organic solvents, such as alcohol, ketone or ester, which are commercially available in great quantities at low prices. As for the polymer for the coating, preferably polyacrylate or polyvinylpyrrolidon/polyvinylacetate-copolymer or polyvinylcaprolactam.

The polymer coating is removed preferably with an alcohol, a ketone or an ester or an aqueous solution of its organic solvent. Particularly advantageous is isopropanol or ethanol or aqueous solutions of the same.

With the at least one polymer layer as well as with the polyvinyl alcohol coating, the original surface quality of the glass substrate surface is maintained As during the whole treatment process and possible transportation. The removal by washing with organic solvents, or aqueous solutions of the same, of the at least one polymer layer is, on the one hand, very safe,- so that in very thin glasses very little glass breakage occurs, and, on the other hand, is thorough, since the at least one polymer layer is completely removed.

Also, if the method were to include an additional post-polishing, microscopic scratches produced by the post-polishing would reduce the surface quality and glass breakage would be increased. The post-polishing is dispensed with in the inventive method.

In both processes, at least one polymer layer is applied preferably directly after the, production of the glass substrate onto the same, for conserving the surface quality of the manufacture before some abrasive or dirt particles can reduce, it. The application can take place directly on the glass train.

Depending on the performing process steps and application methods, the thickness of at least one polymer layer is set to between 0.1 to 100 $\mu$m. A layer thickness of 1 to 15 $\mu$m is particularly advantageous.

With regard to the application, there are diverse possibilities. Three preferable application methods are the immersion, the rolling and the spraying. The immersion is suitable for glasses which are already cut. The rolling is especially good for thick disks. The spraying to the contrary is preferably used for thin layers, and especially for glasses which have the highest surface quality and therefore are coated only on the glass train. In addition the spraying is contactless, so that the contamination of the glass substrate surface is maintained as low as possible. Preferably, the high volume low pressure (HVLP) process is utilized for this purpose, to obtain a maximum homogenous film and to retain as low as possible the overspray, or the overshooting spray fog.

When the glass band is coated not in warm condition (for example 90° C.), the drying process must be enhanced. For this purpose on the one hand the infrared radiation, on the other hand hot air can be used. Both processes have in common that the glass is heated to a temperature of approximately 100° C. Higher temperatures can lead to a modification of the glass layer or the glass. Lower temperatures reduce the drying speed.

During infrared drying the glass is heated with radiation. In particular radiation in a wavelength region between 3 and 10 $\mu$m is especially recommended, as produced for example by gas heat radiators. Alternatively, electric heat radiators can be used.

During hot air drying, the glass band is acted upon at both sides with hot air. The drying can be performed by means of a cloud dryer, so that the glass band is held by the air stream in the cloud and the drier travels without contact.

When the coating must be removed again in shortest time, it is advantageous to enhance the washing with ultrasound.

The sound waves propagate in the washing fluid and remove the coating mechanically.

In a preferable embodiment a polymer layer is applied exactly on the protecting glass substrate surface, which depending on the process is on the basis of polyvinylalcohols or a polymer which is soluble in a polar organic solvent. Thereby the expenses and the costs for this process stage are maintained low.

In special cases, in which the requirements to the protective coating are very high, it is preferable to apply at least two polymer layers which are different as to their solubility so that the layer applied directly on the glass substrate is more soluble than the layer located over it.

In a preferable embodiment, the glass substrate is applied first as a layer on polyvinylalcohol base and thereafter a layer of for example polyacrylate is applied. This has the advantage that the surface coating is very resistant against water and moisture, but both for the application and for the washing out of the coating less organic solvent is required than when an identically thick layer has only polyacrylate or a similar water soluble polymer and thereby the environment is affected less.

The invention also includes display glasses, which at no time are polished, as well as electronic devices, Which are provided with such display glasses. Moreover, the invention also deals with a display glass, whose coating can be removed with polar organic solvents or water at a temperature $\geq 50°$ C. or aqueous solutions of polar organic solvents.

The invention also deals with a hard disk substrate made of glass or glass ceramic, which at no time is polished. Moreover, the invention deals with hard disk substrates, whose coating can be removed with polar organic solvents or water at a temperature $\geq 50°$ C. or aqueous solutions of polar organic solvents. Also, the invention deals with use of such hard disk substrates as an initial blank for hard disks to be used in electronic devices.

The novel features which are considered as characteristic for the present invention are set forth in particular in the appended claims. The invention itself, however, both as to its. construction and its method of operation, together with additional objects and advantages thereof, will be best understood from the following description of specific embodiments when read in connection with the, accompanying drawings.

BRIEF DESCRIPTION OF THE DRAWINGS

FIGS. 1–4 are views schematically illustrating a method of protecting surfaces of glass substrates in accordance with the present invention.

DESCRIPTION OF PREFERRED EMBODIMENTS

A method of display glass manufacture and treatment with an integrated coating in accordance with the inventive method is presented as a schematic example for illustration purposes.

This process includes the steps of glass hot production, spray application of the protective layer, drying of the protective layer illustrated in FIG. 1, cutting, packing illustrated in FIG. 2, transporting, unpacking, edge treatment illustrated in FIG. 3, layer removal illustrated in FIG. 4, and packing and supplying the display glass.

As shown in FIG. 1 the glass first is produced on a downdraw-glass train. A glass band 12 comes vertically downwardly from a pulling shaft 11 and is further supplied in a coating module 13, in which the glass band 12 is coated by spraying and the applied protective layer is also dried. During the passage through the coating module 13, the glass band 12 is deviated by a deviating unit 14 so that the glass band 12 exits horizontally from the coating module 13 and thereby can be placed on a placement table 15.

Then the step of cutting follows. During this step on the one hand the trimmings required for manufacture are cut off, and on the other hand the glass band is cut into individual plates.

Glass disks 22, which are produced in the above-mentioned manner, are packed on another stand location for the purpose of transportation as shown in FIG. 2. For this purpose the individual coated glass disks 22 are stacked on two base plates 23a,b, a cover plate 24 is placed over it, and the entire stack is packed for additional protection from moisture and dirt particles in a metallized LDPE (low density polyethylene) foil 21.

At the predetermined location the glass disks are unpacked as shown in FIG. 3, and treated at the edges. For this purpose each coated glass disk 32 is guided through the oppositely rotating grinding wheels 31. For cooling and withdrawal of the grinding solution, two water jets 33 are oriented onto the edges which are already ground. The grinding serves for example for stabilizing the. glass disk 32 against a glass breakage and for facilitation of handling during the production of the display.

Before packing and supplying, the glass disk 42 is again subjected to a layer removal as shown in FIG. 4. For this purpose it is immersed in an ultrasound container 41 filled with fluid, to wash out the protective layer from the finished display glass disk 42.

Analogous to the above example, the hard disk substrate of glass also can be produced and treated. Also, the hard disk substrate has a guaranteed high surface quality because of the inventive coating process.

Concrete examples of applying and removing a coating are presented herein below.

EXAMPLE 1

Utilization of a polyvinylalcohol (MG=60,000 g/mol) as a spraying solution;

EXAMPLE 2

Utilization of a polyvinylalcohol (MG=150,000 g/mol) as a spraying solution;

EXAMPLE 3

Utilization of a polyvinylcaprolactam solution as a spraying solution;

EXAMPLE 4

Utilization of a polyvinylpyrrolidon-polyvinylacetate copolymer solution as a spraying solution;

EXAMPLE 5

Utilization of an organic polyacrylate solution as a spraying solution;

EXAMPLE 6

Utilization of a polyvinylalcohol (MG=130,000 g/mol) as a circulating solution;

EXAMPLE 7

Utilization of a polyvinylalcohol (MG=150,000 g/mol) as a circulating solution;

EXAMPLE 8

Utilization of a polyvinyl alcohol (MG=150,000 g/mol) as an immersing solution.

1. Utilization of a Polyvinyl Alcohol (MG=60,000 g/mol) as a Spraying Solution.

A polyvinylalcohol is used with a mol mass of approximately 60,000 g/mol (also in the following examples with gel permeation chromatography measured) and a hydrolysis degree of 98%. It has in aqueous solution at 20° C. a viscosity of 10+/−1 mPa's (when not other given, in the following examples measured with ball fall viscosimeter in accordance with DIN 53015). For the processing, a 10% solution is used. It is produced as follows. One weight part of polymer powder is introduced in 9 parts of cold deionized water. The suspension is heated with stirring in a waterbed to >90° C. until complete dissolving. After it is fully dissolved, it is cooled with stirring to room temperature.

The both-side coating on AF 37 glass (alkali free display glass with thermal expansion coefficient of 37) of thickness 0.4 mm is performed by spraying of the solution heated to 70° C. in accordance with HVLP process with 70° C. hot air directly on the cold end of the downdraw glass train with a pulling speed of 1.5 m/min. The nozzle diameter is 0.7 mm, the pressure of the atomized air is 5.5 bar. The polymer solution is supplied with the pressure of 0.5 bar to the nozzle with a throughflow of 16 ml/min with a glass band width to be sprayed of 1 m.

The drying is performed by hot air to obtain a fast drying (>60 s). During this drying process the glass band is acted upon with hot air at both sides. The dryer device can be formed also as a cloud dryer, so that the glass band is held through the air flow in the cloud and passes the dryer without contact. The layerthickness amounts to between 5 and 6 μm. In the edge treatment, the disk is subjected for several minutes to the action of cold water which is supplied in the edge region with the jet of approximately 2 bar pressure onto the disk and sprays the whole surface. The layer removal is performed by washing the disk directly after the edge treatment in hot deionized water (5 min, 80° C., ultrasound enhancement).

2. Utilization of a Polyvinyl Alcohol (MG=150,000 g/mol) as a Spraying Solution.

A polyvinylalcohol is used with a mol mass of approximately 150,000 g/mol and a hydrolysis degree of 99%. It has in aqueous solution at 20° C. a viscosity of 28+/−mPa's. For the treatment a 5% solution is used. It is produced in the following manner. One weight parts of polymer powder is introduced into 19 parts of cold deionized water. The suspension is heated with stiring in a water bath of >90° C. until complete dissolving. After it is fully dissolved it is cooled with stirring until room temperature.

The both-side coating of AF 37 glass (thickness 0.7 mm) is performed by spraying of the solution heated to 70° C. in accordance with HVLP process with 70° C. hot air directly at the cold end of the downdraw glass train at a pulling speed of 1.5 m/min. The nozzle diameter is 0.9 mm, the pressure of the atomized air is 5.5 bar. The polymer solution is supplied with the pressure of 0.4 bar to the nozzle with a throughflow of 16 ml/min with a glass band width to be sprayed of 1 m.

The drying is performed by irradiation with gas infrared radiators, to obtain a fast drying (<60 s). The glass is heated by radiation. It is especially suitable to use radiation in wave length region between 3 and 10 μm, which is produced for example by gas heat radiators. Alternatively, electrical radiators can be used. The layer density amounts to between 5 and 6 μm. In the edge region the disks are subjected for several minutes to the action of cold water, which is supplied in the edge region with a jet of approximately 2 bar pressure onto the disk and sprays the whole surface, while the layer remains completely retained. The layer removal is performed by washing of the disk in aqueous media directly after the edge treatment in hot deionized water with pH=5, with of citric acid (5 min, 60° C., ultrasound enhancement).

3. Utilization of Polyvinylcaprolactam Solution as a Spraying Solution.

A 20% polyvinylcaprolactam solution in ethanol. is utilized. The average. mol mass of the polyacrylate amounts to approximately 100,000 g/mol. The viscosity of a 20% solution amounts to 50–120 mPa's (Brookfield LVT at 23° C. and 60 rpm). The both-side coating on AF 37 glass (thickness 0.8 mm) is performed by spraying of the solution at room temperature in accordance with HVLP process directly at the cold end of the downdraw glass train with a pulling speed of 1.5 m/min. The bothside coating on AF 37 glass (thickness 0.4 mm) is performed by spraying of the solution heated to 40° C. in accordance with the HVLP process with 40° C. hot air directly at the cold, end of the downdraw glass train with a pulling speed of 1.5 m/min. The nozzle diameter is 0.7 mm, the pressure of the atomized air is 5.0 bar. The polymer solution is supplied with a pressure of 0.35 bar to the nozzle with a throughflow of 18 ml/min with a glass band width to be sprayed of 1 m.

The drying is performed in air stream within 30 s. The layer thickness amounts to between 5 and 6 μm.

In the edge treatment region the disks for several minutes are treated with cold water which is supplied in the edge region with the jet of approximately 2 bar pressure onto the disk and sprays the whole surface. The protective layer is easily dissolved but otherwise remains unaffected.

The layer removal is performed by washing of the disk in a mixture of ethanol/water in volume ratio 7:3 at 40° C. with ultrasound enhancement during 8 min.

4. Utilization of Polyvinylpyrrolidon-polyvinyl Acetate Copolymer Solution as a Spraying Solution.

A 20% solution of a copolymer of polyvinylpyrrolidon/polyvinyl acetate (3:7, viscosity approximately 55 mP's at 23° C.) in isopropanol is used. The both-side coating of the AF 37 glass (thickness 0.8 mm) is performed by spraying of the solution at room temperature in accordance with .HVLP process directly at the cold end of the downdraw glass train with a pulling speed of 1.5 m/min. The diameter of the spraying nozzle is 0.7 mm, the pressure of the atomized air is 6 bar. The polymer solution is supplied with the pressure of 0.4 bar to the nozzle with a throughflow of 18 ml/min with a glass band width to be sprayed of 1 m. The drying is performed in airstream within 30 s. The layer thickness amounts to between 5 and 6 μm.

In the edge treatment, the disks are subjected for several minutes to the action of cold water, which is supplied in the edge region in the jet of approximately 2 bar pressure onto the disk and sprays the whole surface. The protective layer remains unaffected.

The layer removal is performed by washing of the disk in a mixture of equal parts of isopropanol and water at 30° C. with ultrasound enhancement during 5 min.

5. Utilization of an Organic Polyacrylate Solution as a Spraying Solution.

A 35% solution in polyacrylate solution in ethanol is utilized. The solution has at 23° C. an efflux time of 12 s (DIN 53211). The both-side coating of the AF glass (thickness 0.8 mm) is performed by spraying the solution at room temperature in accordance with the HVLP process directly at the cold end of the downdraw glass train with a pulling speed of 1.5 m/min. The diameter of the spraying nozzle is 0.43 mm, the pressure of the atomized air is 5 bar. The polymer solution is supplied to the nozzle with a pressure of 0.3 bar with a throughflow of 12 ml/min with a glass band width to be sprayed of 1 m.

The drying is performed in air stream within 20 s. The layer thickness amounts to between 5 and 6 μm.

In the cold treatment the disks are subjected for several minutes to the action of cold water, which is supplied in the edge region with a jet of approximately 2 bar pressure onto the disk and sprays the whole surface. The protective layer remains unaffected.

The coating removal is performed by washing of the disk in isopropanol at 50° C. with ultrasound enhancement during 3 min.

6. Utilization of a Polyvinylalcohol (MG=130,000 g/mol) as a Rolling Solution.

A polyvinylalcohol with a mol mass of approximately 130,000 g/mol and a hydrolysis degree of 97% is utilized. It has in aqueous solution at 20° C. a viscosity of 18+/−1 mPa's. For the treatment a 20% solution is used. It is produced in the following manner. One weight part of polymer powder is introduced into four parts of cold deionized water. The suspension is heated with stirring in a water bath to >90° C. until complete dissolving. After it is fully dissolved, it is cooled with stirring to room temperature. The both-side coating on AF 37 glass (thickness 0.7 mm) is performed by circulating of the cold and therefore high-viscous polymer solution in the region between the trimmings with a glass band width to be coated of 1 m.

The drying is performed by irradiation with gas infrared radiators, to provide a fast drying (<60 s). The layer thickness amounts to between 10 and 12 μm. The coating removal is performed by 8 minute washing with deionized water (pH=13, set with tetramethylammoniumhydroxide (TMAH) at a temperature of 60° C.

7. Utilization of a Polyvinyl Alcohol (MG=150,000 g/mol) as a Rolling Solution.

A polyvinyl alcohol with a mol mass of approximately 150,000 g/mol and a hydrolysis degree of 99% is utilized. It has in aqueous solution at 20° C. a viscosity of 28+/−1 mPa's. For the treatment a 10% solution is utilized. It is produced in the following manner. One weight part of polymer powder is introduced into 9 parts of cold deionized water. The suspension is heated with stirring in a water bed to >90° C. until complete dissolving. After it is fully dissolved, it is cooled with stirring to room temperature.

The both-side coating on AF 37 glass (thickness 0.7 mm) is performed by rolling of the cold and thereby high-viscous polymer solution in the region between the trimmings with a glass band width to be coated of 1 m.

The drying is performed by the irradiation with gas infrared radiators, to provide a fast drying (<60 s). The layer thickness amounts to between 8 and 10 μm. The layer removal is performed by washing (approximately 8 min) with TMAH solution (TMAH=tetramethylammonium hydroxide) with pH=13 and a temperature of 60° C.).

8. Utilization of a Polyvinylalcohol (mg=150,000 g/mol) as an Immersing Solution.

A polyvinylalcohol with a mol mass of approximately 150,000 g/mol and a hydrolysis degree of 99% is used. It has in 4% aqueous solution a 20° C. a viscosity of 28+/−1, mPa's. For the treatment a 5% solution is used. it is produced by the cold suspension of one part of polymer with 19 parts of deionized water, which subsequently is heated to clear solution at 90° C. with stirring. It is further stirred for cooling to room temperature.

The both side coating on AF 37 glass (thickness 0.7 mm) is performed by immersing the glass disk in the cold polymer solution whereby layer thicknesses within the region of 8 μm are obtained.

The drying is performed in the infrared furnace with infrared heat radiators approximately for 2 min with a surface temperature of the radiator field of approximately 250° C. The washing is performed with ultrasound enhancement in hot deionized water at 70° C.

It will be understood that each of the elements described above, or two or more together, may also find a useful application in other types of methods and products differing from the types described above.

While the invention has been illustrated and described as embodied in method of protecting surfaces of glass substrates, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A method of providing a removable protective coating on a glass substrate, said method comprising applying a polymer solution of a polymer in a polar organic solvent to said glass substrate to form at least one polymer layer on said glass substrate;

wherein said polymer is selected from the group consisting of polyacrylate polymers, polyvinyl pyrrolidone/polyvinyl acetate copolymers and polyvinyl caprolactam polymers.

2. The method as defined in claim 1, wherein said polymer is soluble in at least one member selected from the group consisting of alcohols, ketones and esters.

3. The method as defined in claim 1, further comprising removing said removable protective coating from said glass substrate by washing with a wash liquid and wherein said wash liquid comprises said polar organic solvent or another polar organic solvent or an aqueous solution of said polar organic solvent or said another polar solvent.

4. The method as defined in claim 3, wherein said wash liquid comprises at aqueous solutions thereof.

5. The method as defined in claim 3, wherein said wash liquid comprises at least one member selected from the group consisting of isopropanol, ethanol, aqueous solutions containing isopropanol and aqueous solutions containing ethanol.

6. The method as defined in claim 3, wherein said washing is ultrasound-assisted.

7. The method as defined in claim 1, wherein the applying of the polymer solution occurs immediately after making the glass substrate.

8. The method as defined in claim 1, wherein said at least one polymer layer has a thickness of from 0.1 to 100 μm.

9. The method as defined in claim 1, wherein said applying comprises immersing said glass substrate in said polymer solution.

10. The method as defined in claim 1, wherein said applying comprises rolling or spraying said polymer solution on said glass substrate.

11. The method as defined in claim 1, wherein said applying comprises spraying said polymer solution on said glass substrate in a high-volume-low-pressure process.

12. The method as defined in claim 1, wherein said at least one polymer layer is applied just to surfaces of said glass substrate requiring protection during processing steps taking place between the providing of the protective coating and the later removing.

\* \* \* \* \*